Sept. 20, 1932. A. C. SENSOW 1,877,993
SLICING AND CHOPPING MACHINE
Filed July 20, 1928
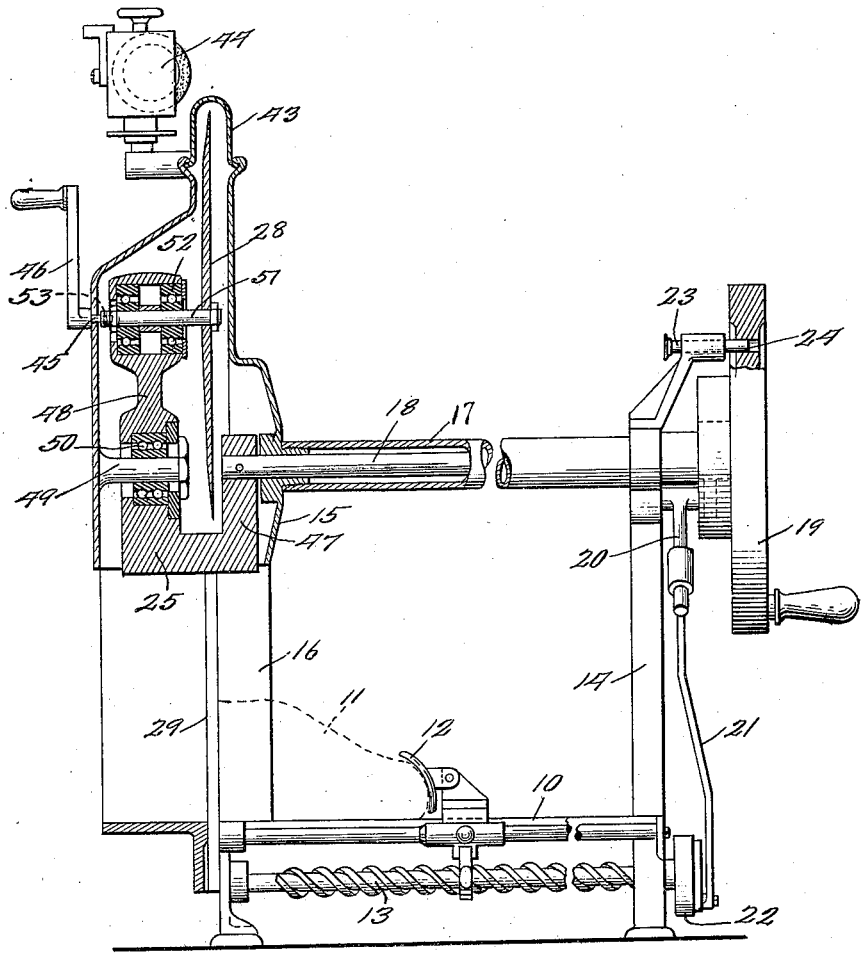
Inventor:
Anton C. Sensow
By Nissen & Crane
Attys Patented Sept. 20, 1932

1,877,993

UNITED STATES PATENT OFFICE

ANTON C. SENSOW, OF LA PORTE, INDIANA, ASSIGNOR TO U. S. SLICING MACHINE COMPANY, OF LA PORTE, INDIANA, A CORPORATION OF INDIANA

SLICING AND CHOPPING MACHINE

Application filed July 20, 1928. Serial No. 294,225.

This invention relates to a machine for cutting substances not easily sliced by a machine having a positively driven rotary knife.

One object of the invention is to provide a slicing machine having a freely pivoted slicing knife unconnected to any source of driving power and rotatable as a whole about an axis eccentric to the knife axis.

Another object is to provide a detachable means for rotating the knife about its own axis while the knife as a whole is stationary so that the knife can be easily sharpened and cleaned.

Other objects will appear as the description proceeds.

In the drawing:—

Fig. 1 is an elevation of my improved slicing machine with parts shown in section.

The cutting and chopping machine of the present invention, while adapted to slice and cut a large variety of food substances, is particularly efficient for cutting substances which are inclined to be mutilated with the draw cut given by the usual slicing machine with a positive driven rotary knife such as pork chops, fish, etc. My improved machine is also peculiarly adapted for the cutting of substances which tend to adhere to a rotary knife, such as candy or substances like cake, the slices of which are usually mutilated by a positive driven rotary knife withdrawing action.

Slicing machines as heretofore constructed, having positively driven rotary circular knives, are not well adapted for slicing cake, or other material the slices of which are easily mutilated, or for slicing candy and similar sticky substances for the reason that a great deal of resistance is offered to the rotary movement of the knife which interferes with the cutting operation of the knife. I have discovered that a disc knife, is, however, admirably adapted for cutting these substances if the knife is left wholly free to assume its own angular position upon its own axis while forced through the material.

The present invention contemplates a slicing machine having a chopping action, in which a pivoted, freely rotatable knife is wholly unconnected from any source of driving power and is free to assume its proper angular position relative to its own axis while the knife, as a whole, is rotating through the material to be cut. While it has heretofore been proposed to provide a slicing knife rotatable as a whole about an eccentric axis, a positive driving mechanism for rotating the knife, comprising some form of gearing, has been used. Even though it were possible to free the gearing permitting it to revolve idly with the knife arm, as, for instance, releasing the gear 30 in the bread slicer such as disclosed in the Patent No. 1,557,893, it is found that the inertia of the gearing connected to the knife causes the knife to revolve about its own axis and while the knife does not revolve in consequence of positively applied power, the knife is prevented from automatically seeking the most advantageous angular position with respect to its own axis when the knife is forced into the material.

I have discovered that by eliminating entirely any mechanism for rotating the knife, that the slicing machine is remarkably efficient in cutting substances difficult to slice, the slices of such substances when obtained from the machine having the usual rotary knife being more or less mutilated.

The slicing machine comprises a slideway 10 upon which the material 11 to be sliced is supported and along which it is slid by a follower 12 operated by a feed screw 13. At one end of the slideway 10 is an upright frame 14 and at the opposite end of the slideway 10 is a housing 15 having an opening 16 therethrough for the passage of the material to be sliced. The frame 14 and housing 15 are connected by a pipe or tubular casing 17 through which the main drive shaft 18 extends, the drive shaft being journaled in the frame 14 and the housing 15. The shaft 18 is rotated by a hand wheel 19 which operates a lever 20 connected by a link 21 and with a one-way drive 22 by means of which the feed screw 13 is intermittently rotated. The hand wheel 19 and shaft 18 may be locked against rotation by a pin 23 arranged to enter an opening 24 in the wheel 19. The shaft 18 carries at its forward end a U-shaped yoke having spaced arms 47 and 48 connected by the portion 25. A stud 49 projects inwardly from the housing in alinement with the drive shaft 18 and through the roller bearings 50 serves as a bearing for the longer arm 48 of the yoke. The knife shaft 51 is journaled in roller bearings 52 at the top of the arm 48 and the circular disc slicing knife 28 is rigid with the knife shaft 51. One end of the knife shaft 51 is provided with a socket 53 formed to receive the reduced polygonal portion 45 of a detachable handle 46.

When the handle 46 is removed and the pin 23 is withdrawn from the socket 24, the hand wheel 19 may be rotated causing the arm 48, the knife shaft 51, and the knife 28, to rotate about the axis of the shafts 18 and 49, the knife 28, being free and wholly unconnected from any driven mechanism whatever, will automatically assume the most favorable angular position for cutting when it strikes the material 11, the material, as previously explained, being of a nature that does not permit the severance of well formed slices with a rotating knife or with a knife that does not freely assume the proper angular position with respect to its own axis when the knife strikes the material to be sliced.

It is very important that the knife can be easily sharpened and cleaned, especially since the sticky material adheres to the face of the knife, impairing its efficiency. I have, therefore, provided the housing 15 with a detachable top portion 43. When it is desired to sharpen or clean the knife, the hand wheel 19 is rotated until the hole 24 is in position to receive the pin 23. The arm 48 is then in upright position with the recess in the end of the shaft 51 alined with an orifice in the housing 15 to receive the reduced end 45 of the handle 46. The knife 28 may be then rotated by means of the handle and the material scraped off the face and the beveled edge portions of the knife.

If it is desired to sharpen the knife, the sharpening mechanism 44, which may be of any conventional kind, is moved in operative relation with respect to the rotating knife 28.

When it is again desired to use the machine for candy cutting, the handle 46 is removed and the pin 23 is withdrawn, permitting rotation of the shaft 18 and the arm 48.

While I have shown but one specific embodiment of my invention, it is to be understood that I do not desire to be limited to the precise details shown and I contemplate making all variations and changes in my invention that fall within the scope of the appended claims.

I claim:—

1. A slicing and chopping machine comprising in combination a continuously rotatable driving shaft, an arm projecting from said shaft, a knife shaft freely pivoted in said arm, a circular disc knife secured to said knife shaft, said shaft having means thereon for co-operating with a detachable handle for rotating said shaft, said pivoted knife shaft being wholly unconnected with the driving mechanism for rotating said knife so that said knife is free to assume its own angular position in either direction of rotation relative to its own axis during the movement of said knife through the material to be sliced.

2. A slicing and chopping machine comprising in combination, a continuously rotatable shaft, an arm projecting from said shaft, a knife shaft freely pivoted in said arm, a circular disc knife secured to said shaft, said pivoted knife shaft being unconnected with the driving mechanism for rotating said knife so that said knife is free to assume its own angular position in either direction of rotation relative to its own axis during the movement of said knife through the material to be sliced, means for holding said arm stationary, and a detachable handle adapted to be directly connected to said knife shaft for rotating said knife shaft and knife.

3. A slicing and chopping machine comprising in combination, a rotary driving shaft, a pair of arms rigid with said shaft, a slicing knife, said arms having a space therebetween to accommodate said slicing knife, a knife shaft rigid with said knife freely pivoted eccentric to said driving shaft in one of said arms, said pivoted knife shaft being wholly unconnected with driving mechanism for rotating said knife so that said knife is free to assume its own angular position relative to its own axis during the movement of said knife through the material to be sliced, a stationary casing covering said arms and knife when in upper position, said knife shaft being formed at one end to co-operate with a detachable handle for rotating said knife, and means for locking said arm stationary in its uppermost position, said casing having an orifice through which said handle may pass to engage said knife shaft when said arm is in its upper position, the edges of said orifice preventing rotation of said first shaft independently of said locking means.

4. A slicing and chopping machine comprising in combination a continuously rotating driving shaft, a yoke having a pair of separated arms rigid with said shaft, a stationary stud shaft alined with said driving shaft upon which one of said arms is journaled; a knife shaft freely pivoted in one of said arms eccentric to said driving shaft, a circular disc knife rigid with said knife shaft, said pivoted knife shaft being wholly unconnected with driving mechanism for rotating said knife so that said knife is free to assume its own angular position in either direction of rotation relative to its own axis during the movement of said knife through the material to be sliced and means for rotating said driving shaft.

5. In a slicing machine, the combination with a rotatable arm, of a rotatable knife carried by said arm eccentrically of the axis of rotation of said arm, a casing for substantially enclosing said arm and knife while said arm and knife are in one position, said casing having an opening therein, a handle extending through said opening, a detachable connection between said handle and said knife for rotating said knife, said handle preventing rotation of said arm while operatively connected to said knife.

6. In a slicing machine, the combination with a housing, a stub shaft mounted rigidly on said housing, an arm journaled for rotation about said stub shaft while supported thereby, a knife carried by said arm eccentrically of said stub shaft, a drive shaft for rotating said arm about its axis, said knife having the cutting plane thereof passing between the ends of said shafts, a rigid connection between said arm and said second shaft so that both of said shafts support said arm rigidly for rotation about its axis, means for rotating said second mentioned shaft, and an operating handle having a detachable connection with said knife connectable only at a predetermined position of said knife and when said knife is in that position, said handle is connectable to said knife substantially concentrically with respect to the axis of rotation of said knife.

7. In a slicing machine, the combination with a housing, a stub shaft mounted rigidly on said housing, an arm journaled for rotation about said stub shaft while supported thereby, a freely rotatable knife carried by said arm eccentrically of said stub shaft, a drive shaft for rotating said arm about its axis, said knife having the cutting plane thereof passing between the ends of said shafts, a rigid connection between said arm and said second shaft so that both of said shafts support said arm rigidly for rotation about its axis, means for rotating said second mentioned shaft, a spindle to which said knife is directly secured, anti-friction bearings for said spindle, and a handle having a direct detachable connection with said spindle for rotating said spindle and having means thereon cooperating with a portion of said slicing machine for holding said knife in sharpening position as said knife is rotated by said handle.

8. In a slicing machine, the combination with a housing, a stub shaft mounted rigidly on said housing, an arm journaled for rotation about said stub shaft while supported thereby, a knife carried by said arm eccentrically of said stub shaft, a drive shaft for rotating said arm about its axis, said knife having the cutting plane thereof passing between the ends of said shafts, a rigid connection between said arm and said second shaft so that both of said shafts support said arm rigidly for rotation about its axis, means for rotating said second mentioned shaft, a spindle to which said knife is directly secured, anti-friction bearing for said spindle, and a handle having a direct detachable connection with said spindle for rotating said spindle for sharpening purposes, said knife spindle being wholly unencumbered by driving mechanism therefor.

In testimony whereof I have signed my name to this specification on this 17th day of July, A. D. 1928.

ANTON C. SENSOW.